UNITED STATES PATENT OFFICE.

WILFRED W. SCOTT, OF GRANTWOOD, NEW JERSEY, ASSIGNOR, BY MESNE ASSIGNMENTS, TO ATMOSPHERIC NITROGEN CORPORATION, OF NEW YORK, N. Y., A CORPORATION OF NEW YORK.

CATALYZER FOR AND PROCESS OF PRODUCING OXIDS OF NITROGEN.

1,399,807. Specification of Letters Patent. Patented Dec. 13, 1921.

No Drawing. Application filed September 7, 1918. Serial No. 253,071.

*To all whom it may concern:*

Be it known that I, WILFRED W. SCOTT, residing at Grantwood, Bergen county, New Jersey, have made a new and useful Improvement in Catalyzers for and Processes of Producing Oxids of Nitrogen, of which the following is a specification.

My invention relates to a process for the production of oxids of nitrogen, particularly for use in making nitric acid; to a catalyzer for converting ammonia and oxygen into oxids of nitrogen; and to a method of making such catalyzer.

I have found that when a gaseous mixture containing ammonia and oxygen is suitably brought into contact with a catalyzer comprising a mixture of an oxid of cobalt and an oxid of aluminum, a good yield of oxids of nitrogen will be obtained.

The catalyzer is preferably prepared by evaporating a water solution of crystallized cobalt nitrate and crystallized aluminum nitrate in a suitable container, first, over a steam bath, then, at a higher temperature, in a sand bath or over a naked flame suitably regulated, and then at a temperature at which red fumes are liberated with formation of a residue of oxids of cobalt and aluminum. This residue is suitably treated to reduce it to particles of suitable size.

This catalyzer, when brought into contact with ammonia and oxygen, in the usual manner, will cause the gases to react to give a good yield of oxids of nitrogen.

When I speak in my specification and claims of oxygen, I desire it to be understood that I do not necessarily use the pure gas, but, on the contrary, prefer to use air.

With a catalyzer so prepared, and preferably at a temperature of 650° to 850° C. a good conversion of ammonia into oxids of nitrogen is obtained. Moreover, such a catalyzer is inexpensive; the materials necessary for its preparation are readily available; and it is easily prepared. Tests seem to show that this catalyzer will have a longer life and be less sensitive to dust and other like accidental and incidental disturbances than any of the other numerous metallic oxid catalyzers (and especially a catalyzer made of cobalt oxid alone) which I have prepared and examined for this purpose.

In order that my invention may be clearly understood, the following specific examples are given, it being understood, of course, that the invention is not to be limited to the exact materials or proportions thereof nor to the other conditions of the example since these may be varied without departing from my invention.

*Example I. Preparing the catalyzer.*

An aqueous solution of aluminum nitrate containing .0347 gms. aluminum per c. c. is made by dissolving the requisite amount of crystallized aluminum nitrate (C. P.) in water. 255 gms. of crystallized cobalt nitrate (of high commercial purity and containing by analysis 20.4% Co.) are now dissolved in 190 c. c. of the above aluminum nitrate solution by heating in a casserole over a steam bath. (I may omit the use of added water, and obtain a solution of cobalt nitrate and aluminum nitrate by mixing these two substances in dry condition and then subjecting the mixture to a temperature sufficiently high to melt them in their own water of crystallization.) The solution so obtained is then evaporated as far as possible on a steam bath, the casserole being covered to keep out dust and dirt, but only loosely, so as to allow ready evaporation. The casserole is then removed from the steam bath and the heating continued over a naked flame, until no more red fumes are given off, and a residue is left containing no nitrogen and consisting of oxids of aluminum and cobalt. This material after cooling is broken up into small pieces and that portion which goes through an eight mesh sieve and is retained on a twenty mesh sieve used as catalyzer.

*Example II. Utilizing the catalyzer for the conversion of ammonia into oxids of nitrogen.*

16.5 gms. of the above catalyzer are placed in a catalytic chamber suitable for the conversion of ammonia into oxids of nitrogen, and there is passed into contact with such catalyzer an air-ammonia gas current containing about 8.3% by volume of ammonia.

I have succeeded in converting as high as 84.5% of the original ammonia content of the gas into oxids of nitrogen.

I am informed that the best rate of conversion can be obtained by producing the catalyzer from the nitrates at a temperature considerably lower than that which would prevail in the catalyzing chamber when the catalyst is used in converting ammonia into oxids of nitrogen; in other words, in keeping the ignition temperature, roughly speaking, between 360° and 650° C. and that, if this precaution be observed, a yield as high as 94% can be obtained. The discovery of this specific fact was not made by me, but I inclose it in order to publish the best method now known to me of preparing the catalyst invented by me, and in order to illustrate its commercial possibilities.

I may vary the proportion of aluminum nitrate to cobalt nitrate given in Example I, as the mixture given in such example is only one of a wide range of suitable mixtures. Catalyzers containing an oxid of cobalt and an oxid of aluminum in the proportion of 100 of cobalt calculated as metal, to anywhere from 2.5 to 30 parts of aluminum calculated as metal, give satisfactory results.

While I prefer to produce my catalyzer by igniting a mixture of cobalt nitrate and aluminum nitrate, an efficient catalyzer may be obtained by igniting a mixture of cobalt sulfate and aluminum sulfate; or preferably, by mixing cobaltous oxid and aluminum oxid, both in powder form, adding water to the mixture to produce a paste, and then applying heat to bring about a granular condition; or by using cobaltous oxid and aluminum hydroxid, or cobalt hydroxid and aluminum hydroxid, moistening and heating sufficiently to produce a catalyzer, that is to say, approximately at a temperature at which the hydroxid, or hydroxids would be converted into oxids.

My improved catalyzer may be used on a carrier as well as in massive form. An efficient catalyzer may be obtained by impregnating pumice with a solution of aluminum and cobalt nitrates, and then igniting to about 360° C.

I claim:

1. The process of producing oxids of nitrogen which comprises causing ammonia and oxygen to combine in the presence of a catalyzer containing an oxid of cobalt and an oxid of aluminum, substantially as and for the purpose described.

2. A catalyzer for producing oxids of nitrogen comprising a product which may be obtained from the ignition of a mixture of cobalt nitrate and aluminum nitrate, substantially as described.

3. A catalyzer for producing oxids of nitrogen comprising a mixture of an oxid of cobalt and an oxid of aluminum, substantially as and for the purpose described.

In testimony whereof I have hereunto set my hand.

WILFRED W. SCOTT.